Patented July 17, 1951

2,560,592

UNITED STATES PATENT OFFICE 2,560,592

ALKYD RESIN

Carl J. Opp and Raymond E. Werner, Cincinnati, Ohio, assignors to Interchemical Corporation, New York, N. Y., a corporation of Ohio No Drawing. Application December 4, 1946, Serial No. 713,932

4 Claims. (Cl. 260—22)

This invention relates to the preparation of modified alkyd resins.

Modified alkyd resins are among the most versatile of all resin types and many have found great commercial utility. Among the most useful of the modified alkyds, are the drying oil-modified alkyds and the non-drying oil-modified alkyds. Incorporation of 25 per cent or more of such oils or the fatty acids from such oils into alkyds overcomes the inherent brittleness of the pure alkyd and gives a resin suitable for use in protective and decorative finishes. One such use for oil-modified alkyds is in blends with Beetle type resins such as urea-formaldehyde and melamine formaldehyde resins for use as baking enamels. Advantages obtained are increased hardness and mar resistance and the finish may be baked at high temperatures without danger of discoloration.

The present invention has as one of its main objects the production of a novel type of modified alkyd resin particularly characterized by containing relatively large amounts of a copolymerized vinyl compound, especially styrene. Large quantities of monomeric styrene are now available due to the large production of this material which was developed during the war, and hence, a practical use for large quantities of this styrene should be of considerable importance. Furthermore, it would be desirable to incorporate such desirable properties of polystyrene as chemical inertness and permanent flexibility into alkyd finishes. Attempts have been made in the past to incorporate polystyrene or styrene-drying oil copolymer into urea-formaldehyde and melamine-formaldehyde resins but little success has been achieved toward that goal due to the incompatibility of polystyrene and these Beetle type resins. Also, even though oil-modified alkyds and the Beetle resins are compatible, mixtures of these two with polystyrene are incompatible, so that formulation of baking enamels by this means is impractical. By our invention, however, we are able to incorporate relatively large amounts of styrene into a fatty oil-modified alkyd or a fatty oil acid-modified alkyd and obtain an alkyd, containing relatively large amounts of presumably copolymerized styrene and which alkyd is compatible with the Beetle type resins such as urea-formaldehyde and melamine-formaldehyde resin. Many other uses of our novel resin are contemplated, as, for instance, in formulation of various types of resinous protective finishes. Also, our novel resins, due to their good emulsifying properties, are excellent dispersing agents for pigments, etc.

The process of preparing the novel modified resins of our invention is applicable not only to the preparation of styrene-fatty oil-modified alkyd but also to the preparation of fatty oil-modified alkyds which are modified by other polymerizable vinyl compounds which are equally as reactive as styrene. Such compounds include the simple aliphatic diolefins, such as isoprene and cyclopentadiene, and the acrylate monomers such as acrylonitrile and methyl methacrylate. The term fatty oil as used herein refers to the high molecular weight carboxylic acids and esters as are found in the relatively fast drying natural and synthetic triglyceride oils and resins, for example, dehydrated castor oil, China-wood oil, rosin, etc. These acids are generally considered to consist of high molecular weight carboxylic acids which contain conjugated double bonds or double bonds which readily isomerize to conjugated double bonds. For the purposes of our invention we prefer to use such conjugated unsaturated high molecular weight carboxylic acids which contain from about 10 to about 20 carbon atoms.

The modified alkyds of our invention are prepared by first heating a mixture of the vinyl compound with the desired proportion of conjugated unsaturated high molecular weight carboxylic acid in the presence of a peroxide catalyst and a mercaptan modifier according to the procedure covered by our copending application, Serial Number 713,931, filed December 4, 1946, to form a vinyl compound-fatty oil copolymer. This copolymer is then converted to a partial ester by methods known to the art as, for instance, cooking with sufficient polyhydric alcohol, in the presence of an alkaline catalyst such as calcium oxide, to form approximately the mono-ester of the alcohol with the fatty acid groups in the copolymer. The partial ester is then esterified with an organic polybasic acid or anhydride to form the alkyd. Such a process produces a novel modified resin conveniently described as a vinyl compound-fatty oil-modified alkyd and is an advantageous process for producing a homogeneous resin composition of vinyl compounds with fatty oil-modified alkyds.

We may use any of the vinyl compound-fatty oil copolymers prepared by the process described in our copending application, in preparing the novel modified alkyd resins of the present invention. When the vinyl compound-triglyceride oil, such as the styrene-dehydrated castor oil copolymer is used, it will of course, be necessary to convert the copolymer to a partial ester by alcoholysis of the ester with polyhydroxy alcohol before an alkyd can be formed. When a vinyl compound-unsaturated carboxylic acid copolymer such as styrene-dehydrated castor oil acids or styrene-rosin acid copolymers are employed in the process of our invention it will be necessary to use a larger amount of polyhydroxy alcohol than is necessary when the triglyceride esters are used. In such cases the polyhydroxy alcohol may be esterified with the styrene-acid copolymer to form the partial ester and then the partial ester may be cooked with polybasic acid to form an alkyd resin, or the styrene-acid copolymer may be cooked with the polyhydric alcohol and polybasic acid in one cook. It will be obvious to those skilled in the art of preparing fatty acid or rosin modified alkyds that the particular procedure used to prepare alkyds according to our invention may vary from one preparation to another and will depend for the most part on the particular starting materials employed. Essentially, however, the process will be the same after the partial ester of the vinyl compound-fatty oil acid copolymer or vinyl compound-rosin acid copolymer has been obtained.

We know of no limitations on the ratio of vinyl compound copolymer and polyhydric alcohol and polybasic carboxylic acid which may be reacted to give the novel products of our invention. Hence the ratios of the various reactants used will be governed by the properties which will be desired in the alkyd. To those experienced in the art of cooking alkyd resin it will be obvious that our process can be used to prepare alkyd resins having a wide variety of properties. For example, large ratios of a 60:40 styrene-dehydrated castor oil copolymer would tend to give an alkyd having more pronounced properties resulting from styrene copolymer than an alkyd containing small ratios of the styrene copolymer. Similar results would be expected with all the other types of vinyl compound copolymers with conjugated unsaturated high molecular weight fatty acids and rosin acids.

The alkyd portion of our resins may be formed from any of the commonly used polyhydric alcohols and polybasic carboxylic acids. Polyhydric alcohols such as ethylene glycol, diethylene glycol, glycerol or pentaerythritol are preferred because they are more readily available than other polyhydroxy alcohols such as mannitol, sorbitol, and the like. Similarly, such readily available polybasic carboxylic acids as phthalic, citric, maleic, fumaric, sebacic, azelaic, adipic, itaconic and Petrex acids (Hercules Powder Co.) are preferred to other less readily available acids. Petrex acids is the trade name of a condensation product of maleic anhydride and terpene, the composition, manufacture, modification, and uses of which are disclosed in U. S. 1,882,298; 1,978,598; 1,993,025–037; 2,011,707; 2,022,149; 2,025,947; and 2,047,004.

The invention will be more fully understood by reference to several particular embodiments of the invention as shown in the following examples, in which the parts are by weight.

*Example I*

Forty parts of styrene and 60 parts of dehydrated castor oil were copolymerized by heating to a liquid temperature of about 260° C., in a flask equipped with stirrer, reflux condenser and trap for removal of water, and in the presence of a catalytic amount of tertiary butyl hydroperoxide and from 0.5–5.0%, based on styrene, of tertiary butyl mercaptan. The viscosity of the resultant styrene-castor oil copolymer was about 377 poises at 30° C. One hundred parts of this copolymer was then cooked at about 230° C. with about 14 parts of glycerol with good agitation and a stream of carbon dioxide bubbling through the reaction mixture. A trace of calcium oxide was added to catalyze the reaction. The temperature was maintained at about 230° C. until reaction was complete, as indicated by a clear drop of the resin on glass while hot. At this point heating and agitation were stopped and about 31 parts of phthalic anhydride added cautiously. The temperature was again raised to about 230° C. and held until the reaction product had an acid value of 45. Then about 3.5 parts of glycerol was added and the temperature was continued at about 230° C., until the acid number was below 20 and the viscosity of resin, cut to 60 per cent total non-volatile constituents in solvent naphtha, was 15 poises. The yield of unreduced resin was about 90 per cent based on starting materials. This resin when formulated with a typical melamine-formaldehyde resin such as Melmac 245–8, a 50% solution of hydrophobic butylated melamine-formaldehyde resin in an equal admixture of butanol and xylene, and pigment to make a baking enamel, gave a coating which had excellent soap resistance and sufficient flexibility to pass the conical mandrel test.

*Example II*

A partial ester was prepared by heating 88.5 parts of 40–60 styrene-dehydrated castor oil copolymer to about 175° C. and then gradually adding a trace of calcium oxide catalyst and 11.5 parts of pentaerythritol during the course of about one-half hour, during which time the mixture was continuously stirred and heated at such a rate that the temperature rose to about 230° C. The temperature was held at about 230° C. for about one and one-half hours or until the reaction product formed a clear droplet on glass. This partial ester was then esterified by heating with about 12 parts of phthalic anhydride to give a styrene-fatty oil-modified alkyd.

*Example III*

An alkyd resin having good emulsifying properties was obtained by esterifying 100 parts of the partial ester of Example II with about 18 parts of phthalic anhydride.

*Example IV*

One hundred parts of the partial ester of Example II was heated with 26 parts of Petrex acids at about 230° C. until the reaction mixture had a gel time of 15–20 sec. on a constant temperature hot plate. The resultant alkyd when reduced with an aromatic solvent such as Solvesso #3 (hydrogenated petroleum solvent) B. P. 175–210° C. to a viscosity of V to W (Gardner scale) had an acid number of 24–26 based on solids and had excellent emulsifying properties.

*Example V*

A partial ester was prepared according to the procedure in Example II from 90 parts of a 30–70 styrene-dehydrated castor oil copolymer and 10 parts of pentaerythritol. Eighty six parts of this partial ester was then esterified with 14 parts of phthalic anhydride. When the resultant alkyd was cut to 50 per cent total non-volatile constituents with Solvesso #3, the solution had a viscosity of T to U and an acid number of 19 based on solids.

*Example VI*

Eighty one parts of the partial ester of Example V was esterified with 19 parts of Petrex acids. The resultant alkyd, when cut to 50 per cent total non-volatile constituents with Solvesso #3 had a viscosity of P and an acid number of 25 based on solids.

Example VII

A 50–50 styrene-dehydrated castor oil copolymer was prepared and converted to a partial ester by cooking 87 parts of the copolymer with 13 parts of pentaerythritol according to the procedure of Example I. Esterification of 83 parts of the partial ester with 17 parts of phthalic anhydride gave an alkyd soluble in hydrocarbon solvents.

Example VIII

Seventy-seven parts of the partial ester of Example VII, when esterified with 23 parts of Petrex acids gave an alkyd soluble in hydrocarbon solvents. When the alkyd was cut to 50 per cent total non-volatile with Solvesso #3 the solution had a viscosity of U and an acid number of 26 based on solids.

Example IX

Eighty eight and one-half parts of styrene-linseed oil copolymer containing 40 parts of styrene and 60 parts of alkali refined linseed oil was cooked to the partial ester with 11.5 parts of pentaerythritol according to the procedure of Example II. An alkyd was formed by esterifying 79 parts of this partial ester with 21 parts of Petrex acids, the esterification being carried out by a procedure similar to that of Example IV. The alkyd, when cut to 50 per cent total non-volatiles with Solvesso #3, had a viscosity of N and an acid number of 19 based on solids.

Example X

To 626 parts of 40-60 styrene-dehydrated castor oil fatty acid copolymer was added 174 parts glycerine, and 200 parts of phthalic anhydride and the mixture heated to 450° F. in 1 hour with stirring under an atmosphere of carbon dioxide. After cooking for 2¼ hours the product was a clear, viscous homogeneous alkyd with acid number 11.5. When the alkyd was reduced to 60% total non-volatile constituents with xylol, the solution had a viscosity of about 2.3 poises and color of 7 (Gardner scale). One advantage of using styrene-fatty acid copolymer to make the alkyd, as shown in this example is that the alkyds formed can be reduced with solvent to compositions having higher solids and lighter body than alkyds formed from styrene-fatty oil copolymers.

Example XI

To 900 parts of dehydrated castor oil heated to 350° F. was added 600 parts of methyl methacrylate, about 12 parts of t-butyl mercaptan and about 15 parts of t-butyl hydroperoxide, by means of a dropping funnel which extended below the liquid surface. While the mixture was continuously stirred under reflux the temperature was gradually raised to 500° F. The total cooking time was 10 hours. To 1320 parts of this 40-60 methyl methacrylate-dehydrated castor oil copolymer was added 180 parts of glycerine and 0.2 parts of calcium oxide and the mixture cooked to form a partial ester. The resulting partial ester was cooked with 415 parts of phthalic anhydride and 45 parts of glycerine to form an alkyd by a procedure similar to that used to prepare the alkyd in Example I above. Total cooking time was 6 hours. The clear, homogeneous alkyd product, when reduced to 60% total non-volatile constituents with xylol, had a viscosity of about 4.5 poises. The resin can be formulated with pigment and Beetle type resins to give baking enamels.

It will be understood that while we have described herein certain specific embodiments of our invention, it is not intended that we limit ourselves to such specific embodiments but rather that we are to be limited only by the conditions within the scope of the appended claims.

We claim:

1. An alkyd resin comprising the reaction product of a partial ester and a polybasic carboxylic acid wherein the said partial ester is a polyhydric alcohol partially esterified with the conjoint polymerization product of styrene with a conjugated ethylenically unsaturated fatty oil acid in the presence of a peroxide catalyst and an alkyl mercaptan having at least four carbon atoms, such alkyd resin being compatible with urea-formaldehyde and melamine-formaldehyde resins.

2. An alkyd resin comprising the reaction product of a partial ester and a polybasic carboxylic acid wherein the said partial ester is a polyhdyric alcohol partially esterified with the conjoint polymerization product of styrene with dehydrated castor oil fatty acid in the presence of a peroxide catalyst and an alkyl mercaptan having at least four carbon atoms, such alkyd resin being compatible with urea-formaldehyde and melamine-formaldehyde resins.

3. A method for preparing an alkyd resin comprising heating at esterification temperatures a partial ester with a polybasic carboxylic acid wherein the said partial ester is a polyhydric alcohol partially esterified with the conjoint polymerization product of styrene with a conjugated ethylenically unsaturated fatty oil acid in the presence of a peroxide catalyst and an alkyl mercaptan having at least four carbon atoms, such alkyd resin being compatible with urea-formaldehyde and melamine-formaldehyde resins.

4. A method for preparing an alkyd resin comprising heating at esterification temperatures of a partial ester with a polybasic carboxylic acid wherein the said partial ester is a polyhdyric alcohol partially esterified with the conjoint polymerization product of styrene with dehydrated castor oil fatty acid in the presence of a peroxide catalyst and an alkyl mercaptan having at least four carbon atoms, such alkyd resin being compatible with urea-formaldehyde and melamine-formaldehyde resins.

CARL J. OPP.
RAYMOND E. WERNER.

REFERENCES CITED

The following references are of record in the file of this patent:

UNITED STATES PATENTS

| Number | Name | Date |
|---|---|---|
| 2,392,710 | Wakeford et al. | Jan. 8, 1946 |